United States Patent
Thompson et al.

(10) Patent No.: US 10,938,783 B2
(45) Date of Patent: Mar. 2, 2021

(54) CLUSTER-BASED DETERMINATION OF SIGNATURES FOR DETECTION OF ANOMALOUS DATA TRAFFIC

(71) Applicant: A10 NETWORKS, INC., San Jose, CA (US)

(72) Inventors: Micheal Thompson, Meridian, ID (US); Vishnu Vasanth Radja, San Jose, CA (US); Vernon Richard Groves, San Jose, CA (US); Diptanshu Purwar, San Jose, CA (US)

(73) Assignee: A10 Networks, Inc., San Jose, CA (US)

( * ) Notice: Subject to any disclaimer, the term of this patent is extended or adjusted under 35 U.S.C. 154(b) by 207 days.

(21) Appl. No.: 16/124,699

(22) Filed: Sep. 7, 2018

(65) Prior Publication Data
US 2020/0036684 A1 Jan. 30, 2020

Related U.S. Application Data

(63) Continuation-in-part of application No. 16/046,728, filed on Jul. 26, 2018.

(51) Int. Cl.
*H04L 29/06* (2006.01)

(52) U.S. Cl.
CPC ...... *H04L 63/0263* (2013.01); *H04L 63/1416* (2013.01); *H04L 63/1425* (2013.01); *H04L 63/20* (2013.01)

(58) Field of Classification Search
CPC . H04L 63/20; H04L 63/1458; H04L 63/0263; H04L 63/1425; H04L 63/1416
See application file for complete search history.

(56) References Cited

U.S. PATENT DOCUMENTS

| | | | |
|---|---|---|---|
| 10,248,533 B1 * | 4/2019 | Shah | G06F 11/3452 |
| 2012/0240185 A1 * | 9/2012 | Kapoor | H04L 41/0866 726/1 |
| 2016/0359740 A1 * | 12/2016 | Parandehgheibi | G06F 16/122 |

* cited by examiner

*Primary Examiner* — Tri M Tran
(74) *Attorney, Agent, or Firm* — Keith Kline; The Kline Law Firm PC

(57) ABSTRACT

Provided are methods and systems for cluster-based determination of signatures for detection of anomalous data traffic. An example method may include capturing, by a network module, data packets routed to a destination. The method may further include grouping, by at least one processor in communication with the network module, the data packets into clusters. The method may also include detecting, by the processor, an anomaly in the data packets and, in response to the detection, determining, by the processor and based on the clusters, one or more signatures associated with the data packets. The method may further include generating, by the processor and based on the signatures, one or more rules for allowing the data packets. The method may further include providing, by the processor, the one or more rules to a policy enforcement point associated with the destination.

20 Claims, 7 Drawing Sheets

CLUSTER-BASED DETERMINATION OF SIGNATURES FOR DETECTION OF ANOMALOUS DATA TRAFFIC

CROSS REFERENCE TO RELATED APPLICATIONS

This application claims the priority of and is a Continuation-in-Part of U.S. patent application Ser. No. 16/046,728, titled "Cluster-Based Precision Mitigation of Network Attacks," filed on Jul. 26, 2018. The disclosure of the above-referenced patent application is incorporated herein by reference for all purposes.

TECHNICAL FIELD

This disclosure relates generally to data processing and, more particularly, to system and method for cluster-based determination of signatures for detection of anomalous data traffic.

BACKGROUND

The approaches described in this section could be pursued but are not necessarily approaches that have previously been conceived or pursued. Therefore, unless otherwise indicated, it should not be assumed that any of the approaches described in this section qualify as prior art merely by virtue of their inclusion in this section.

Transmission Control Protocol/Internet Protocol (TCP/IP) based traffic has a finite set of behaviors in a given security context. Violations of TCP/IP protocol can be detected while checking structures associated with the protocol. Creating dynamic policies (or rules) for checking data packets can be challenging since the intent behind the traffic patterns may not be known. Traditional methods of detecting distributed denial of service (DDoS) attacks are based on slope calculations, ratio calculations, and other methods to describe abnormal vs. nominal traffic patterns. However, once an anomaly is observed, there needs to be a way to create policy that limits the effects of mitigating the anomaly on the normal traffic.

SUMMARY

This summary is provided to introduce a selection of concepts in a simplified form that are further described in the Detailed Description below. This summary is not intended to identify key features or essential features of the claimed subject matter, nor is it intended to be used as an aid in determining the scope of the claimed subject matter.

The present disclosure relates to methods and systems for cluster-based determination of signatures for detection of anomalous data traffic. Embodiments of the present disclosure may allow dynamical generation of rules for checking data packets to be used in policy enforcement points in data traffic network.

According to one embodiment of the present disclosure, a method for cluster-based determination of signatures for detection of anomalous data traffic is provided. The method may include capturing, by a network module, data packets routed to a destination. The method may also include grouping, by at least one processor in communication with the network module, the data packets in clusters. The method may also include detecting, by the least one processor, an anomaly in the data packets and, in response to the detection, determining, by the processor and based on the clusters, one or more signatures associated with the data packets. The method may also include generating, by the processor and based on the signatures, one or more rules for allowing the data packets and providing, by the processor, rules for a policy enforcement point associated with the destination.

Grouping the data packets in clusters may include transforming the data packets into a set of multidimensional vectors according to a pre-determined mapping and clustering of multidimensional vectors. The clustering can be carried out using a K-means algorithm. The number of clusters can be optimized using a silhouette analysis. The method may include determining, by the processor, outliers and inliers for the one or more clusters. The method may include generating, by the processor, the one or more rules based on the inliers.

The method may include determining, by the processor, the highest density cluster within the clusters. The method may proceed to determine, by the processor and based on the highest density cluster, an anomalous signature. The method may also include generating, based on the anomalous signature, a rule for blocking the data packets and providing, by the processor, the rule for blocking the data packets to the policy enforcement point.

The method may include receiving, by the processor, further data packets of the traffic flow and testing, by the at least one processor, the rules against the further data packets to estimate reliabilities of the rules.

The method may also include optimizing, by the processor, parameters of the rules to increase the reliabilities of the rules. The parameters of the rules can be optimized based on one or more constraints. The parameters of the rules can be optimized using a genetic algorithm.

In further example embodiments of the present disclosure, the method steps are stored on a machine-readable medium comprising instructions, which when implemented by one or more processors perform the recited steps. In yet further example embodiments, hardware systems or devices can be adapted to perform the recited steps. Other features, examples, and embodiments are described below.

BRIEF DESCRIPTION OF THE DRAWINGS

Embodiments are illustrated by way of example, and not by limitation, in the figures of the accompanying drawings, in which like references indicate similar elements.

DETAILED DESCRIPTION

Figure 1:
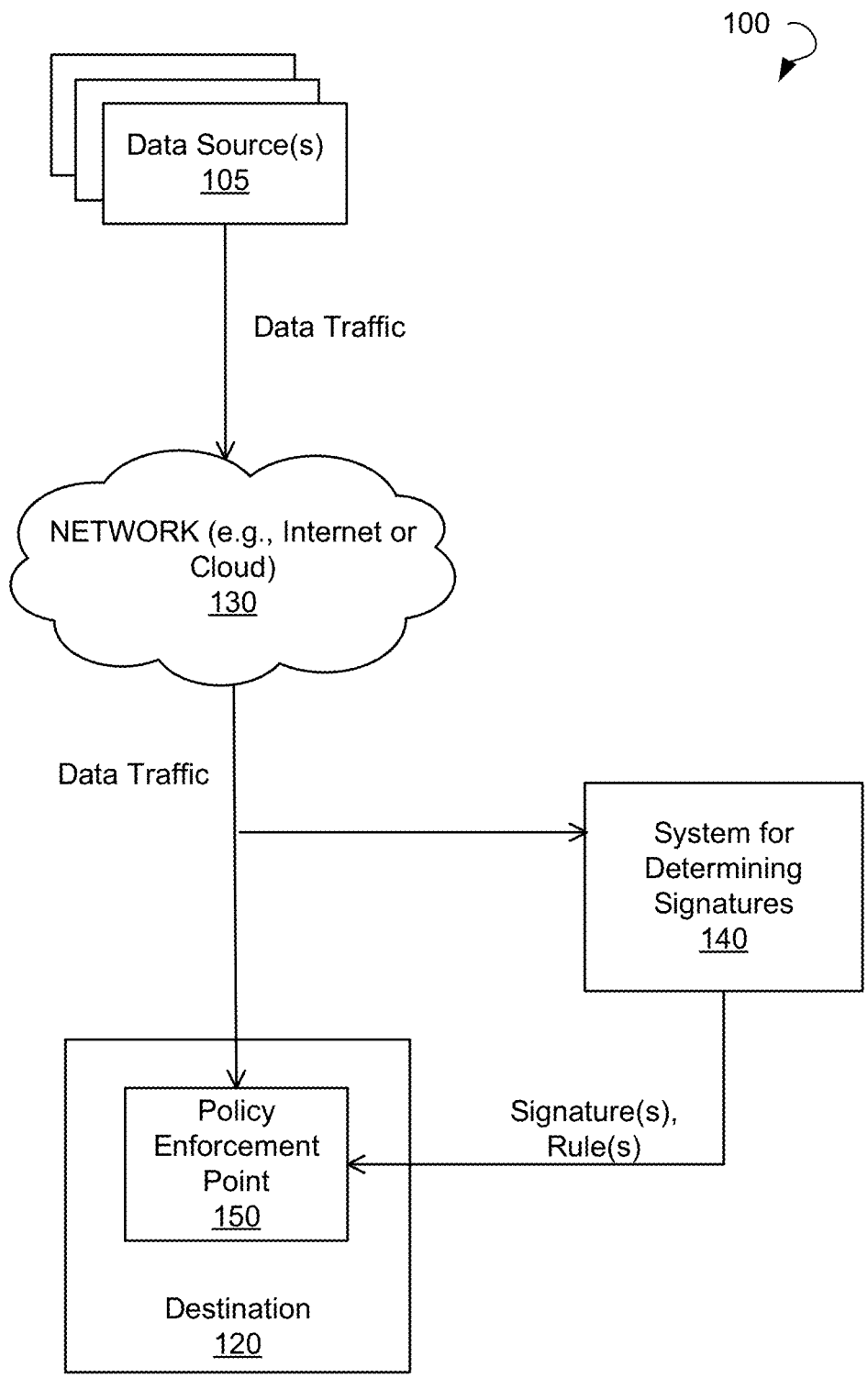
FIG. 1 is a block diagram showing an example environment, wherein methods for cluster-based determination of signatures for detection of anomalous data traffic can be implemented.

The following detailed description includes references to the accompanying drawings, which form a part of the detailed description. The drawings show illustrations in accordance with example embodiments. These example embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is therefore not to be taken in a limiting sense, and the scope is defined by the appended claims and their equivalents. In this document, the terms "a" and "an" are used, as is common in patent documents, to include one or more than one. In this document, the term "or" is used to refer to a nonexclusive "or," such that "A or B" includes "A but not B," "B but not A," and "A and B," unless otherwise indicated.

The techniques of the embodiments disclosed herein can be implemented using a variety of technologies. For example, the methods described herein can be implemented in software executing on a computer system or in hardware utilizing either a combination of microprocessors or other specially designed application-specific integrated circuits (ASICs), programmable logic devices, or various combinations thereof. In particular, the methods described herein can be implemented by a series of computer-executable instructions residing on a storage medium such as a disk drive, or computer-readable medium. It should be noted that methods disclosed herein can be implemented by a computer (e.g., a desktop computer, a tablet computer, a laptop computer, and a server), game console, handheld gaming device, cellular phone, smart phone, smart television system, and so forth.

The present disclosure relates to methods and systems for cluster-based determination of signatures for detection of anomalous data traffic. Embodiments of the present disclosure may allow dynamical generation of policies (or rules) for checking data packets to be used in policy enforcement points in data traffic network. Some embodiments of the present disclosure may facilitate extraction of a signature from the observations of packets resident as bits on the wire, structures located in databases, and memory or files. The extracted signatures can be provided directly to modules which permit the transformation of or encoding of signatures. The signatures can be distributed to a policy enforcement point. Embodiments of the present disclose include observations of data packets during a "peace time" and a "war time" to simulate the effects of policies (or rules) generated based on the extracted signature on the traffic flow. Some embodiments may apply genetic algorithm to continually evolve the signatures to optimize the positive and negative effects on the traffic flow. The extracted signatures can be stored for future distribution and utilization.

According to an example embodiment of the present disclosure, a method for cluster-based determination of signatures for detection of anomalous data traffic may include capturing, by a network module, data packets routed to a destination. The method may include grouping, by at least one processor in communication with the network module, the data packets in clusters. The method may also include detecting, by the processor, an anomaly in the data packets. In response to the detection, the method may proceed with determining, by the processor and based on the clusters, one or more signatures associated with the data packets. The method may also include generating, by the processor and based on the one or more signatures, one or more rules for allowing the data packets and providing, by the processor via the network module, the rules to a policy enforcement point associated with the destination.

Referring now to the drawings, FIG. 1 is a block diagram showing an environment 100, wherein the methods for cluster-based determination of signatures for detection of anomalous data traffic can be implemented. The environment 100 may include data source(s) 105, destination 120, network 130, system for determining signatures 140, and policy enforcement point 150.

The data source(s) 105 may include computer systems, for example user devices, such as but not limited to a laptop computer, a tablet computer, a desktop computer, a cellular phone, a smart phone, a gaming console, a multimedia system, a smart television device, a set-top box, an infotainment system, an in-vehicle computing device, informational kiosk, and so forth. The data source(s) 105 can be configured to send data packets, for example TCP/IP requests, to destination 120, via a network 130.

The destination 120 may include a standalone computing device, server, or a cloud-based computing resource shared by multiple users. The cloud-based computing resource(s) can include hardware and software available at a remote location and accessible over a network (for example, the Internet). The cloud-based computing resource(s) can be dynamically re-allocated based on demand. The cloud-based computing resources may include one or more server farms/clusters including a collection of computer servers which can be co-located with network switches and/or routers.

The destination 120 may include a policy enforcement point 150. The policy enforcement point can be implemented as standalone network device connected to the destination 120 or a module of instructions stored in memory of the destination 120 and to be executed by one or more processors of the destination 120. The policy enforcement point may be configured to filter (to allow or block) data packets routed to the destination 120. The policy enforcement points 150 may include loaded modules for filtering the data packets. The loaded modules can be generated by the system 140. The policy enforcement point can be also configured to apply policy (or rules) for allowing or blocking data packets. The rules can be generated and provided to the policy enforcement point 150 by the system 140.

The network 130 may include any wired, wireless, or optical networks including, for example, the Internet, intranet, local area network (LAN), Personal Area Network (PAN), Wide Area Network (WAN), Virtual Private Network (VPN), cellular phone networks (e.g., Global System for Mobile (GSM) communications network, packet switching communications network, circuit switching communications network), Bluetooth radio, Ethernet network, an IEEE 802.11-based radio frequency network, a Frame Relay network, Internet Protocol (IP) communications network, or any other data communication network utilizing physical layers, link layer capability, or network layer to carry data packets, or any combinations of the above-listed data networks.

In some embodiments, the system 140 can be implemented as a standalone network computing device in other embodiments, the system 140 can be implemented as a module of instructions stored in memory of the destination 120 and to be executed by one or more processor of the destination 120. The system 140 can be configured to monitor data traffic routed to the destination 150 and dynamically determine signatures of the data traffic and rules for allowing and blocking the data packets and provide the signature(s) and the rule(s) to the policy enforcement point 150.

Figure 2:
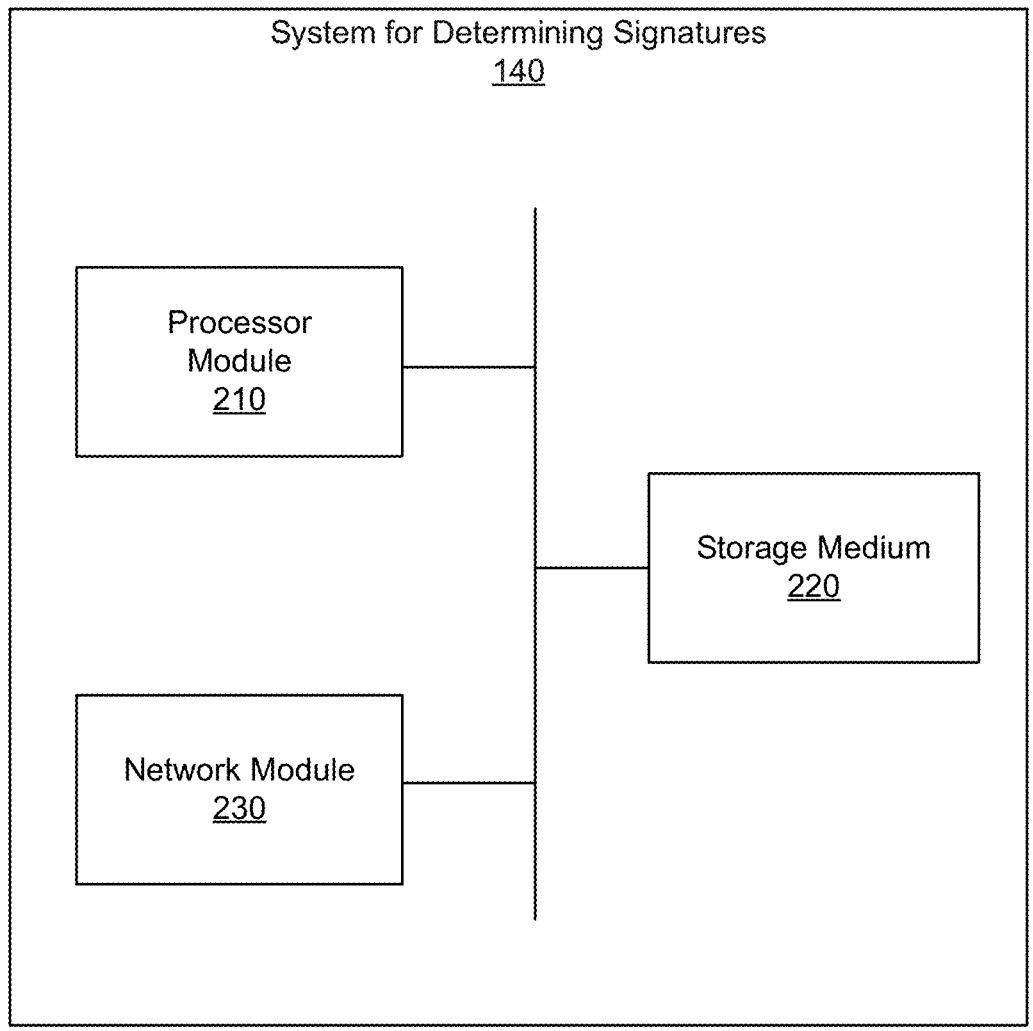
FIG. 2 is a block diagram showing an example system for cluster-based determination of signatures for detection of anomalous data traffic, according to an example embodiment.

FIG. 2 is a block diagram showing an example system 140 for determining signatures of data traffic, according to one example embodiment of the present disclosure. The system 140 may include a processor 210, a storage medium 220, and a network module 230.

The processor module 210 may include one or more processors which may be a micro-processor, an Intel processor, an AMD processor, a MIPS processor, an ARM-based processor, or a RISC processor. The processor module 210 may include one or more processor cores embedded in a processor. Processor module 210 may also include one or more embedded processors, or embedded processing elements in a Field Programmable Gate Array (FPGA), an ASIC, or Digital Signal Processor (DSP).

The storage medium 220 may include RAM, DRAM, SRAM, SDRAM, or memory utilized by processor module 210 or network module 230. The storage medium 220 may stores data utilized by processor module 210. The storage medium 220 may include a hard disk drive, a solid-state drive, an external disk, a DVD, a CD, or a readable external disk. The storage medium 220 may stores one or more computer programming instructions which when executed by processor module 210 or network module 230 implement one or more of the functionalities of the present disclosure.

The network module 230 may include a network interface such as Ethernet, optical network interface, a wireless network interface, T1/T3 interface, or a WAN or LAN interface. The network module 230 may include a network processor.

Figure 3:
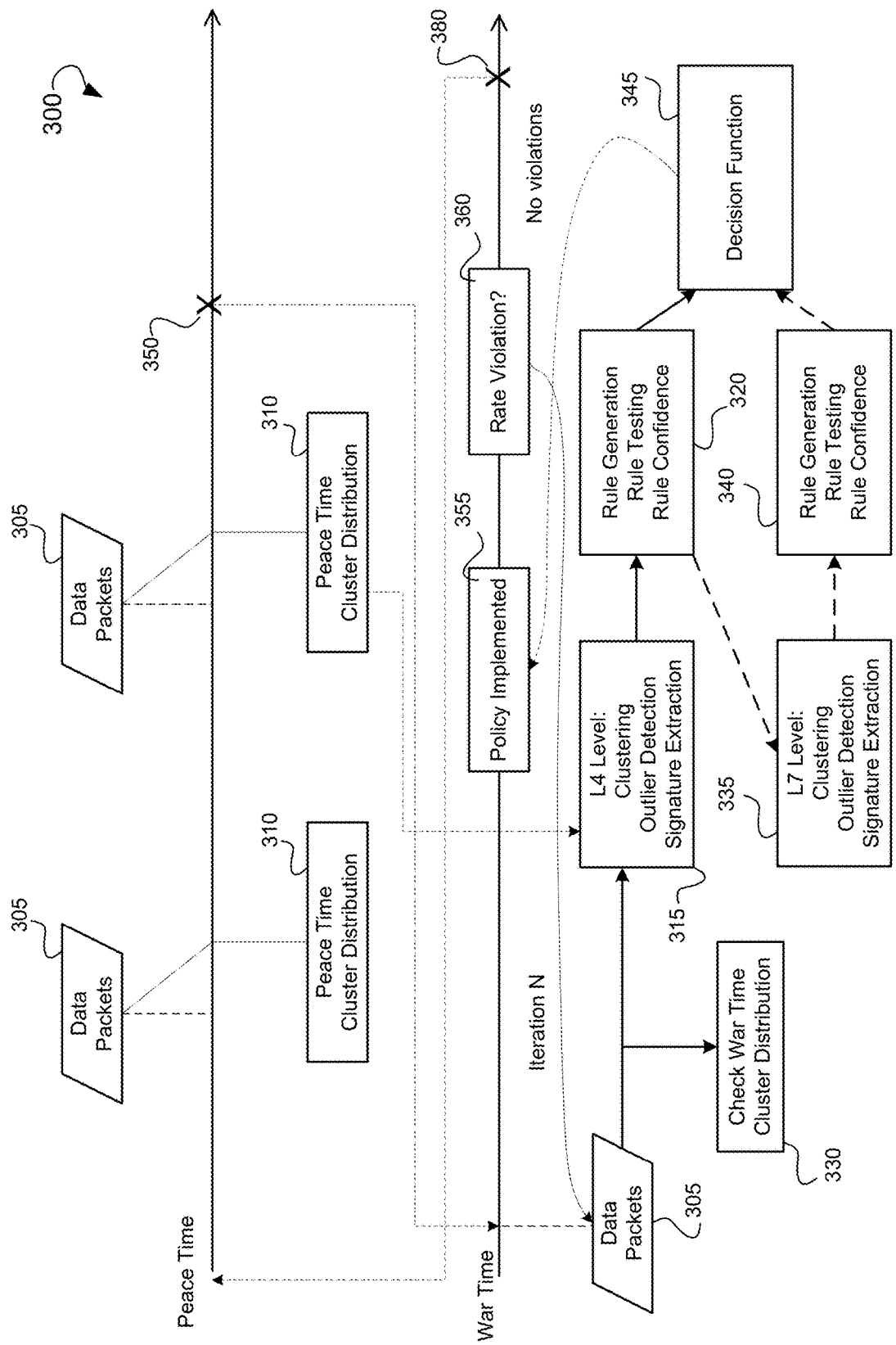
FIG. 3 is a high-level process diagram showing a method for cluster-based determination of signatures for detection of anomalous data traffic, according to some example embodiments.

FIG. 3 is a flow chart of a method 300 for cluster-based determination of signatures for detection of anomalous data traffic, according to some example embodiments. The method 300 may be implemented by the system 140 within the environment 100.

The method 300, may commence, in block 310, with periodically processing the data packets 305 to obtain clusters. The data packets can belong to a data traffic routed to a single destination. The processing of the data packets can be done during both "peace time" and "war time". The "peace time" can be a time without anomalies in data traffic. The "war time" can be a time during which an anomaly in the data traffic is detected.

The data packet 305 can be captured in blocks of a pre-determined size, for example 10,000 of packets. The data packets 305 may include TCP/IP data packets. During the "peace time", the structure of the data packets 305 can be analyzed using a transport layer (layer 4) protocol. During the "war time" the data packets 305 can be analyzed using a transport layer (layer 4) protocol or an application layer (layer 7) protocol.

To be grouped in clusters, the data packets can be converted to a set of vectors in multi-dimensional vector space. Transformation of the data packets into vectors can be carried out by using a pre-determined mapping. The pre-determined mapping can be specific to the destination 120 and can be kept secret. The vectors that represent the data packets can be further divided into clusters.

The vectors representing the data packets can be partitioned into clusters using a clustering algorithm, such as K-means algorithms. The K-means algorithms is performed iteratively to assign each data point to one of K groups based on a metrics defined in the vector space. The results of the K-means clustering algorithm can be represents as a set of centroids of the K clusters and cluster identifiers for the clusters. The data packets can be labeled with the cluster identifiers. Each data packet can be assigned to a single cluster. A new packet can be assigned to one of the one of the cluster by mapping the new packet to a new vector and determining to which cluster of vectors the new vector belongs.

Figure 4:
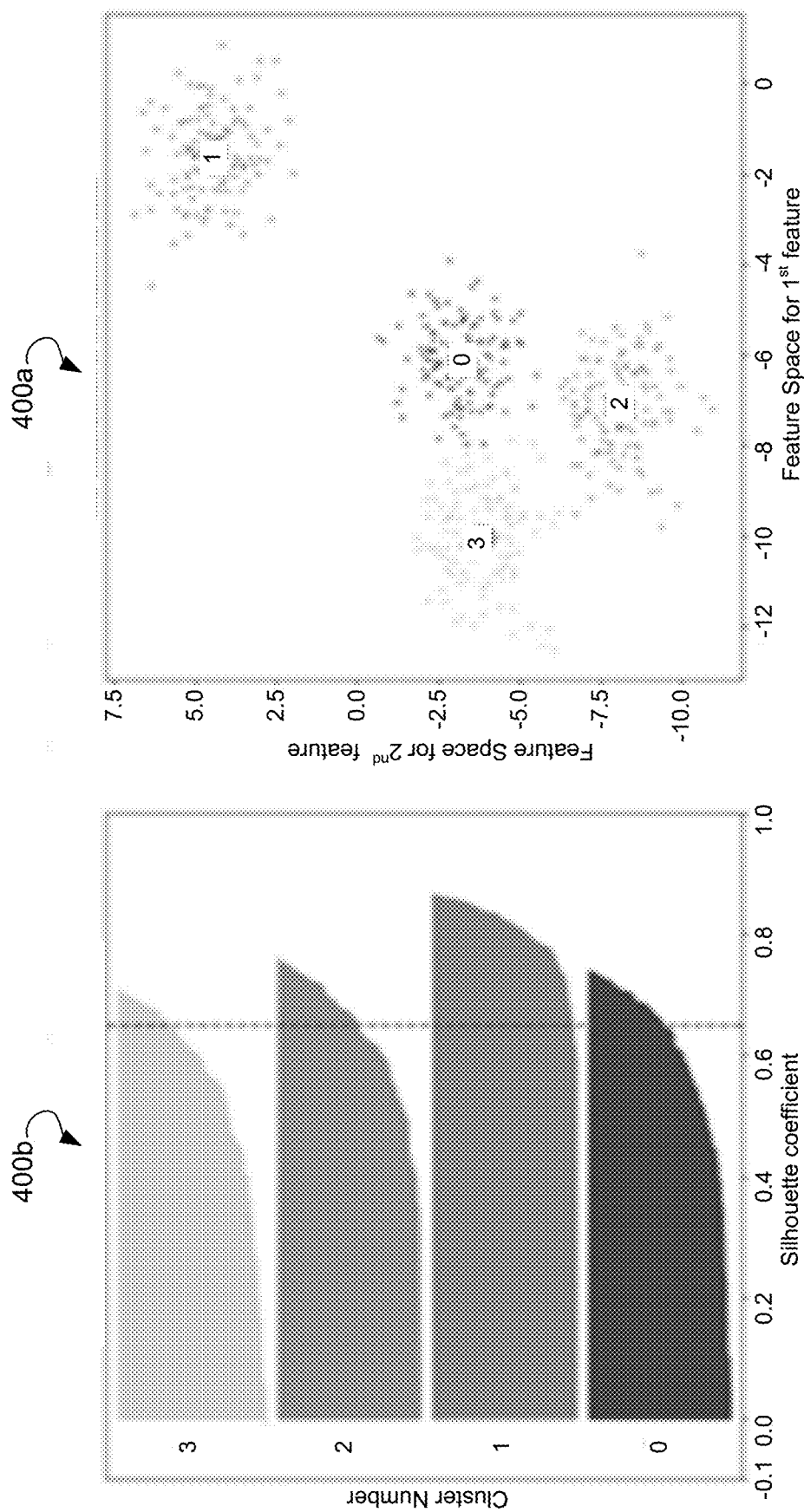
FIG. 4A shows a plot of silhouette coefficients for the clusters.
FIG. 4B shows a plot representing clusters of data packets.

A silhouette analysis can be applied to find an optimal number of clusters. FIG. 4A shows a plot of Silhouette coefficients, for example clusters shown in FIG. 4B. The Silhouette coefficient of a data point in a cluster is a measure of how far the point is from other clusters. Silhouette coefficients can run values from −1 to +1. Silhouette coefficients near +1 indicate that the data points are far away from the neighboring clusters. Silhouette coefficients 0 indicate that the data point is very close to the boundary between two neighboring clusters. Negative values may indicate that data points have been assigned to a wrong cluster. The number of clusters can be selected so that silhouette coefficients of vectors in cluster are closer to +1.

Figure 5:
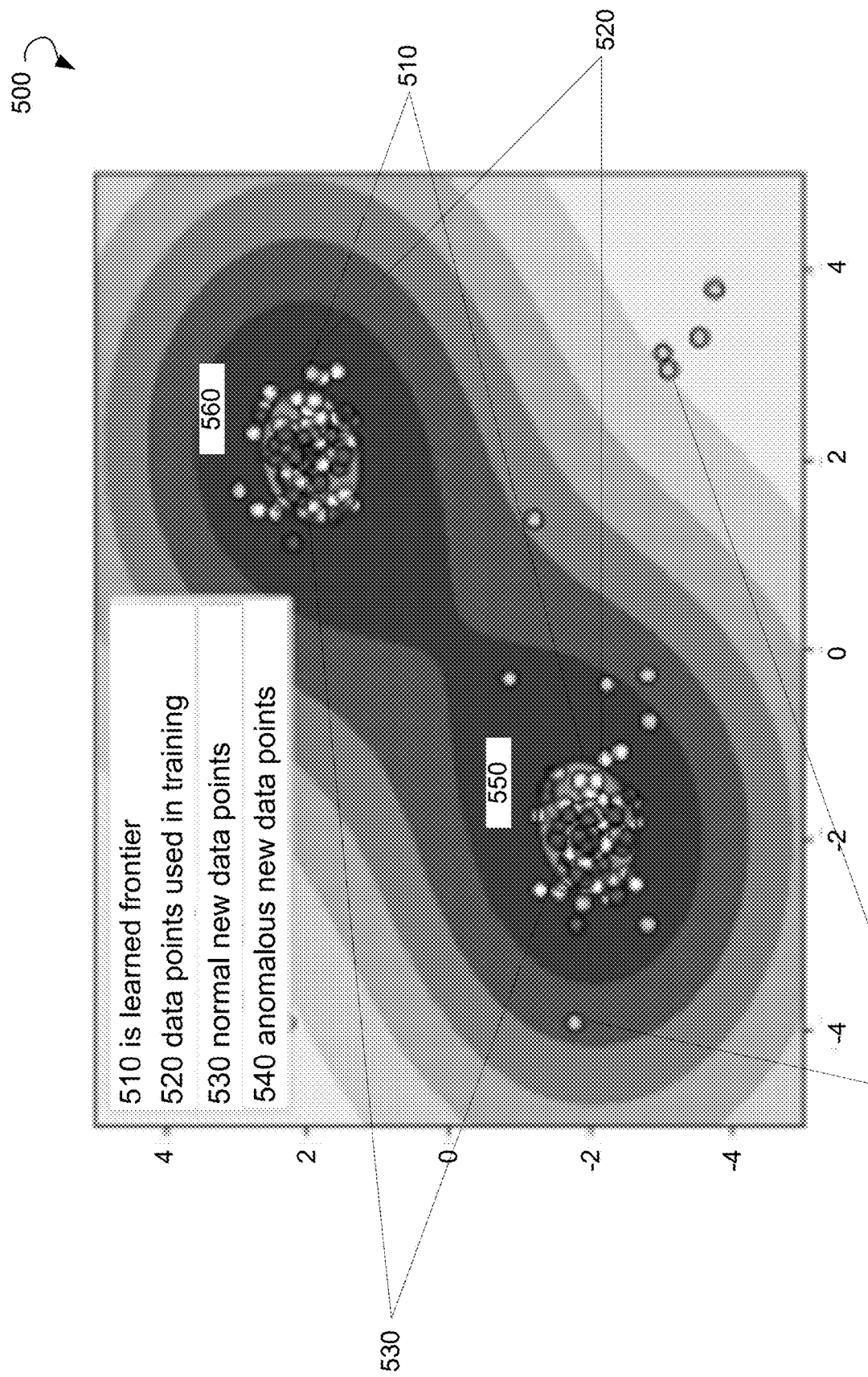
FIG. 5 shows a plot representing clusters of data packets.

After generating clusters, a model of outlier detection can be determined for each of the clusters. FIG. 5 shows example clusters 550 and 560. The points 520 are used to obtain the clusters. For each of clusters, boundaries 510 can be determined. In a two-dimensional space, the boundaries 510 may represent closed curves. Using the boundaries 510, new data points can be classified as either normal if they lie within the boundaries 510 or as abnormal if they lie outside the boundaries 510.

Referring back to FIG. 3, the method 300 may include detection of an anomaly in the data traffic. In the example shown in FIG. 3, the detection occurs at a point of time 350. In response to the detection of anomaly, in block 315 the method 300 may proceed with grouping data packets into clusters. The number of clusters and parameters of clusters determined during the "peace time" can be used as initial approximations for number of clusters and the parameters to be obtained in the "war time".

At each N iteration of K-means clustering, the method 300 may perform, in block 330, silhouette analysis to determine an optimal number of clusters. In block 315, the method 300 may proceed with clustering data packets 305, determining outlier detection models for the clusters, and extracting signatures of data traffic. A "good signature" of the data traffic can be extracted for each of the clusters based on the inliers within the clusters. A "bad signature" can be further extracted from the cluster with the highest density. The signature can be extracted using an iterations procedure based on a genetic algorithm.

In block 320, the method 300 may generate rules based on the signatures. The method 300 may include performing a frequency analysis to determine the most frequent value for header fields (source, destination port, sequence number, header length, flags, checksum, and others) in data packets for each of the classes. The method 300 may further include calculations of the most frequent values of header fields against entire data in clusters and calculate confidence levels of the values of the fields. The fields with the most frequent value higher than 50% of the confidence level may be considered as signature fields and can be used in generation of rules.

The rules can be further tested against data packets to determine confidence of the rules. If there is a rule that allows both a significant number of permits and significant number of blocks for the data packets, the method 300 may proceed to block 335 for inspection of data packets at the application level protocol. Mapping the data packets to the multi-dimensional vector space can be performed with a mapping different than the mapping at level 4. Method 300 may include generation of new clusters, determining new outlier detection models, and extraction of new signatures. In block 340, the method 300 may proceed with generating rules based on the new signature, testing the rules, and determining the confidence level of the rules.

A genetic algorithm utilizing different inputs can be applied in order to optimize the rules. Thereafter, the rules can be morphed based on constraints. The fittest rule can be identified based on various inputs and outputs.

In block 345, the method 300 may proceed with generating, based on the rules, decision functions that can be provided to the policy enforcement point in order to filter data packets. In block 355, the method 300 may proceed with implementing the rules to filter data packets from the traffic flow. In block 360, the method 300 may calculate rates of violation of rules by data packets. If, for a pre-determined time, no violations of rules by data packets occurs, then method 300 may proceed to block 310 and perform a "peace time" clustering of data packets. In the example of FIG. 3, switching to the "peace time" clustering occurs at time point 380.

Figure 6:
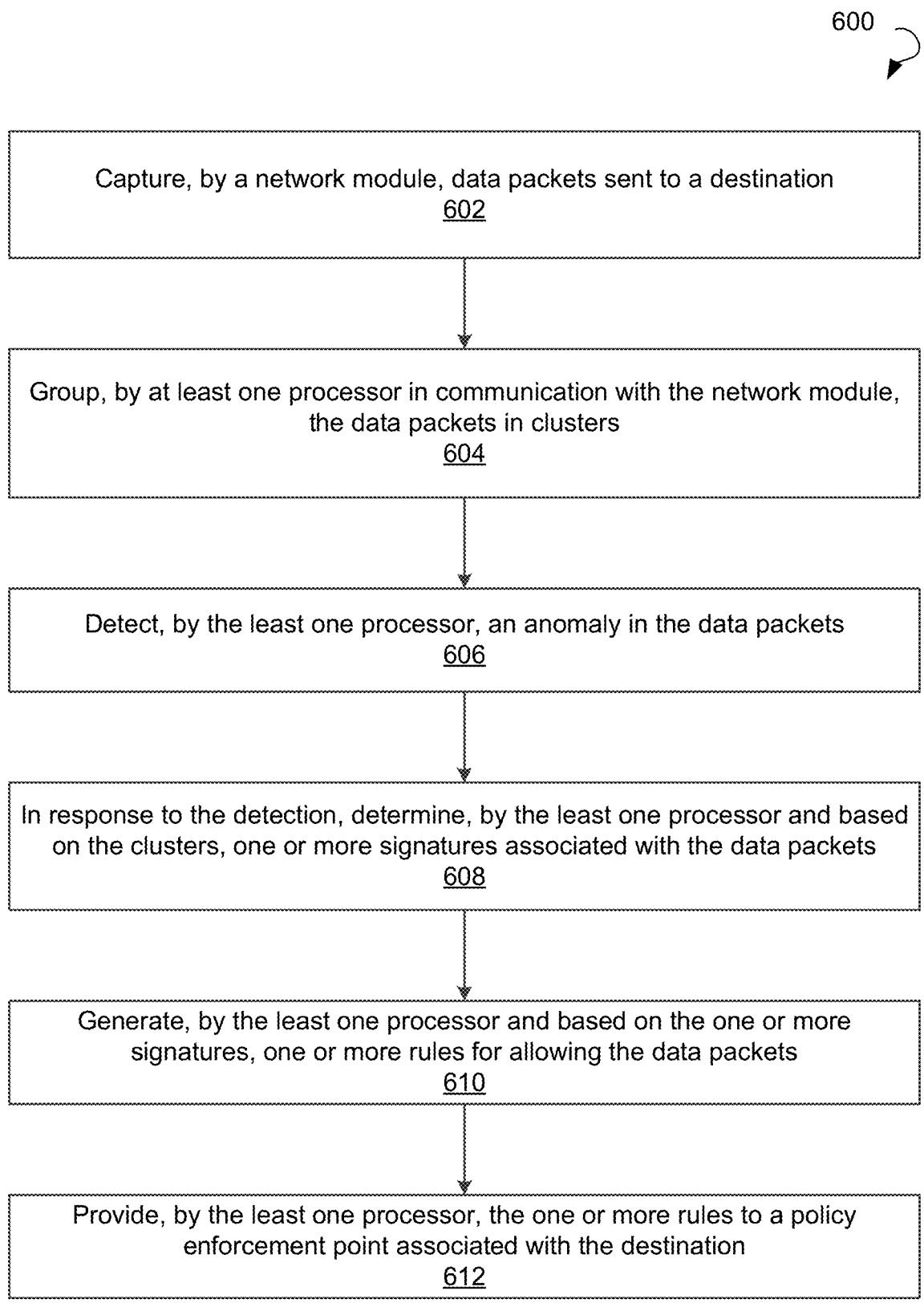
FIG. 6 is a process flow diagram showing a method for cluster-based determination of signatures for detection of anomalous data traffic.

Referring now to FIG. 6, steps of a method 600 for cluster-based determination of signatures for detection of anomalous data traffic are shown, according to an example embodiment. In some embodiments the steps may be combined, performed in parallel, or performed in a different order. The method 600 may also include additional or fewer steps than those illustrated. The steps of the method 600 can be executed by components of the environment 100 shown in FIG. 1.

The method 600 can commence, in block 602, with capturing, by a network module, data packets routed to a destination. In block 604, the method 600 may proceed with grouping, by at least one processor in communication with the network module, the data packets in clusters. In block 606, the method 600 may detect, by the processor, an anomaly in the data packets. In response to the detection of the anomaly, the method 600 may determine, in block 608, by the processor and based on the clusters, one or more signatures associated with the data packets. In block 610, the method may include generating, by the processor and based on the one or more signatures, one or more rules for allowing data packets. In block 612, the method 600 may provide, by the least one processor, the one or more rules to a policy enforcement point associated with the destination. In an example embodiment, the method 600 may, optionally, include assigning importance weights to each of the one or more signatures based on historical signature data. Based on the assignment of the importance weights to the one or more signatures, one or more weighted signatures may be generated. In this example embodiment, one or more rules may be generated based on the one or more weighted signatures.

Figure 7:
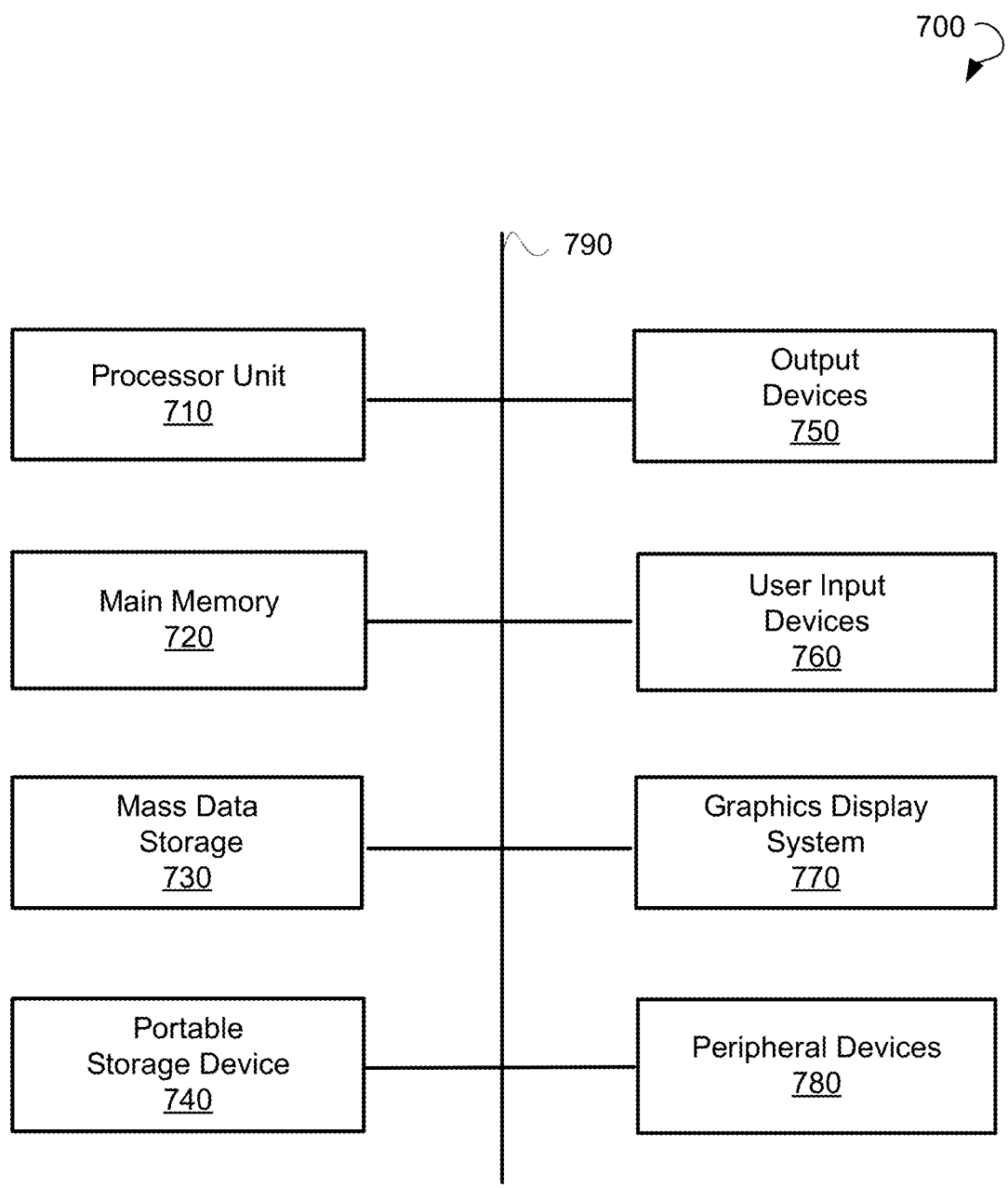
FIG. 7 shows a diagrammatic representation of a computing device for a machine, within which a set of instructions for causing the machine to perform any one or more of the methodologies discussed herein can be executed.

FIG. 7 illustrates an example computer system 700 that may be used to implement embodiments of the present disclosure. The system 700 of FIG. 7 can be implemented in the contexts of the likes of computing systems, networks, servers, data sources, destinations, policy enforcement points, or combinations thereof. The computing system 700 of FIG. 7 includes one or more processor units 710 and main memory 720. Main memory 720 stores, in part, instructions and data for execution by processor 710. Main memory 720 stores the executable code when in operation. The computer system 700 of FIG. 7 further includes a mass data storage 730, portable storage device 740, output devices 750, user input devices 760, a graphics display system 770, and peripheral devices 780. The methods may be implemented in software that is cloud-based.

The components shown in FIG. 7 are depicted as being connected via a single bus 790. The components may be connected through one or more data transport means. Processor unit 710 and main memory 720 are connected via a local microprocessor bus, and the mass data storage 730, peripheral device(s) 780, portable storage device 740, and graphics display system 770 are connected via one or more I/O buses.

Mass data storage 730, which can be implemented with a magnetic disk drive, solid state drive, or an optical disk drive, is a non-volatile storage device for storing data and instructions for use by processor unit 710. Mass data storage 730 stores the system software for implementing embodiments of the present disclosure for purposes of loading that software into main memory 720.

Portable storage device 740 operates in conjunction with a portable non-volatile storage medium, such as a floppy disk, CD, DVD, or Universal Serial Bus (USB) storage device, to input and output data and code to and from the computer system 700 of FIG. 7. The system software for implementing embodiments of the present disclosure is stored on such a portable medium and input to the computer system 700 via the portable storage device 740.

User input devices 760 provide a portion of a user interface. User input devices 760 include one or more microphones; an alphanumeric keypad, such as a keyboard, for inputting alphanumeric and other information; or a pointing device, such as a mouse, a trackball, stylus, or cursor direction keys. User input devices 760 can also include a touchscreen. Additionally, the computer system 700 as shown in FIG. 7 includes output devices 750. Suitable output devices include speakers, printers, network interfaces, and monitors.

Graphics display system 770 includes a liquid crystal display (LCD) or other suitable display device. Graphics display system 770 receives textual and graphical information and processes the information for output to the display device.

Peripheral devices 780 may include any type of computer support device to add additional functionality to the computer system.

The components provided in the computer system 700 of FIG. 7 are those typically found in computer systems that may be suitable for use with embodiments of the present disclosure and are intended to represent a broad category of such computer components that are well known in the art. Thus, the computer system 700 of FIG. 7 can be a PC, hand held computing system, telephone, mobile computing system, workstation, tablet, phablet, mobile phone, server, minicomputer, mainframe computer, or any other computing system. The computer may also include different bus configurations, networked platforms, multi-processor platforms, and the like. Various operating systems may be used including UNIX, LINUX, WINDOWS, MAC OS, PALM OS, ANDROID, IOS, QNX, and other suitable operating systems.

It is noteworthy that any hardware platform suitable for performing the processing described herein is suitable for use with the embodiments provided herein. Computer-readable storage media refer to any medium or media that participate in providing instructions to a central processing unit (CPU), a processor, a microcontroller, or the like. Such media may take forms including, but not limited to, non-volatile and volatile media such as optical or magnetic disks and dynamic memory, respectively. Common forms of computer-readable storage media include a floppy disk, a flexible disk, a hard disk, magnetic tape, any other magnetic storage medium, a Compact Disk Read Only Memory (CD-ROM) disk, DVD, BLU-RAY DISC (BD), any other optical storage medium, RAM, Programmable Read-Only Memory (PROM), Erasable Programmable Read-Only Memory (EPROM), Electronically Erasable Programmable Read Only Memory (EEPROM), flash memory, and/or any other memory chip, module, or cartridge.

In some embodiments, the computer system 700 may be implemented as a cloud-based computing environment, such as a virtual machine operating within a computing cloud. In other embodiments, the computer system 700 may itself include a cloud-based computing environment, where the functionalities of the computer system 700 are executed in a distributed fashion. Thus, the computer system 700, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computer system 800, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

Thus, methods and systems for cluster-based determination of signatures for detection of anomalous data traffic are disclosed. While the present embodiments have been described in connection with a series of embodiments, these descriptions are not intended to limit the scope of the subject matter to the particular forms set forth herein. It will be further understood that the methods are not necessarily limited to the discrete components described. To the contrary, the present descriptions are intended to cover such alternatives, modifications, and equivalents as may be included within the spirit and scope of the subject matter as disclosed herein and defined by the appended claims and otherwise appreciated by one of ordinary skill in the art.

What is claimed is:

1. A system for cluster-based determination of signatures for detection of anomalous data traffic, the system comprising:
   a network module configured to capture data packets routed to a destination; and
   at least one processor in communication with the network module, the at least one processor is configured to:
   group the data packets in clusters;
   upon the grouping, detect an anomaly in the data packets; and
   in response to the detection:
   determine, based on the clusters, for each of the clusters, one or more signatures associated with the data packets, the determining the one or more signatures including:
   determining outliers for the clusters; and
   based on the outliers, extracting signatures associated with the anomalous data traffic, the one or more signatures including at least the signatures associated with the anomalous data traffic;
   generate, based on at least the signatures associated with the anomalous data traffic, one or more rules for blocking the data packets associated with the anomalous data traffic; and
   provide the one or more rules to a policy enforcement point associated with the destination.

2. The system of claim 1, wherein the grouping of the data packets in clusters includes:
   transforming the data packets into a set of multidimensional vectors according to a pre-determined mapping; and
   clustering the set of multidimensional vectors.

3. The system of claim 2, wherein the clustering includes using a K-means algorithm, wherein a number of clusters is optimized using a silhouette analysis.

4. The system of claim 1, wherein the processor is further configured to assign importance weights to each of the one or more signatures based on historical signature data to generate one or more weighted signatures, wherein the generation of the one or more rules is based on the one or more weighted signatures.

5. The system of claim 1, wherein the at least one processor is configured to:
   determine inliers for the one or more clusters; and
   generate the one or more rules based on the inliers.

6. The system of claim 1, wherein the at least one processor is configured to:
   determine a highest density cluster in the set of the clusters; and
   determine, based on the highest density cluster, an anomalous signature;
   generate, based on the anomalous signature, a rule for blocking the data packets; and
   provide the rule for blocking the data packets to the policy enforcement point.

7. The system of claim 1, wherein the at least one processor is configured to:
   receive further data packets of the traffic flow; and
   test the one or more rules against the further data packets to estimate reliabilities of the one or more rules.

8. The system of claim 1, wherein the at least one processor is configured to optimize parameters of the one or more rules to increase the reliabilities of the one or more rules.

9. The system of claim 8, wherein the at least one processor is configured to optimize the parameters of the one or more rules based on one or more constraints.

10. The system of claim 8, wherein the at least one processor is configured to optimize the parameters of the one or more rules using a genetic algorithm.

11. A method for cluster-based determination of signatures for detection of anomalous data traffic, the method comprising:
    capturing, by a network module, data packets routed to a destination;
    grouping, by at least one processor in communication with the network module, the data packets into clusters;

upon the grouping, detecting, by the least one processor, an anomaly in the data packets; and in response to the detection:

determining, by the least one processor and based on the clusters, for each of the clusters, one or more signatures associated with the data packets, the determining the one or more signatures including:

determining outliers for the clusters; and based on the outliers, extracting signatures associated with the anomalous data traffic, the one or more signatures including at least the signatures associated with the anomalous data traffic;

generating, by the least one processor and based on at least the signatures associated with the anomalous data traffic, one or more rules for blocking data packets associated with the anomalous data; and providing, by the least one processor, the one or more rules to a policy enforcement point associated with the destination.

12. The method of claim 11, wherein the grouping the data packets in clusters includes:

transforming the data packets into a set of multidimensional vectors according to a pre-determined mapping; and clustering the set of multidimensional vectors.

13. The method of claim 12, wherein the clustering is based on a K-means algorithm, wherein a number of clusters is optimized using a silhouette analysis.

14. The method of claim 11, further comprising assigning importance weights to each of the one or more signatures based on historical signature data to generate one or more weighted signatures, wherein the generation of the one or more rules is based on the one or more weighted signatures.

15. The method of claim 13, further comprising:

determining, by the at least one processor, inliers for the one or more clusters; and generating, by the at least one processor, the one or more rules based on the inliers.

16. The method of claim 11, further comprising:

determining, by the at least one processor, a highest density cluster within the clusters; and determining, by the at least one processor and based on the highest density cluster, an anomalous signature;

generating, by the at least one processor and based on the anomalous signature, a rule for blocking the data packets; and providing, by the at least one processor, the rule for blocking the data packets by the policy enforcement point.

17. The method of claim 11, further comprising:

receiving, by the at least one processor, further data packets of the traffic flow; and testing, by the at least one processor, the one or more rules against the further data packets to estimate reliabilities of the one or more rules.

18. The method of claim 17, further comprising:

optimizing, by the at least one processor, parameters of the one or more rules to increase the reliabilities of the one or more rules.

19. The method of claim 17, wherein the parameters of the one or more rules are optimized based on one or more constraints.

20. A non-transitory computer-readable medium having embodied thereon a program, the program providing instructions for a method for cluster-based determination of signatures for detection of anomalous data traffic, the method comprising:

capturing, by a network module, data packets routed to a destination;

grouping, by at least one processor in communication with the network module, the data packets in clusters;

upon the grouping, detecting, by the least one processor, an anomaly in the data packets; and in response to the detection:

determining, by the least one processor and based on the clusters, for each of the clusters, one or more signatures associated with the data packets, the determining the one or more signatures including:

determining outliers for the clusters; and based on the outliers, extracting signatures associated with the anomalous data traffic, the one or more signatures including at least the signatures associated with the anomalous data traffic;

generating, by the least one processor and based on at least the signatures associated with the anomalous data traffic, one or more rules for blocking data packets associated with the anomalous data traffic; and providing, by the least one processor, the one or more rules to a policy enforcement point associated with the destination.

* * * * *